Jan. 2, 1968  D. S. BLISS  3,361,081
TRACTION SYSTEMS COMPRISING VEHICLES FOR
TRAVELLING ALONG A PREPARED TRACK
Filed Sept. 26, 1966  2 Sheets-Sheet 1

INVENTOR
D. S. BLISS
BY
Cameron, Kerkam & Sutton
ATTORNEYS

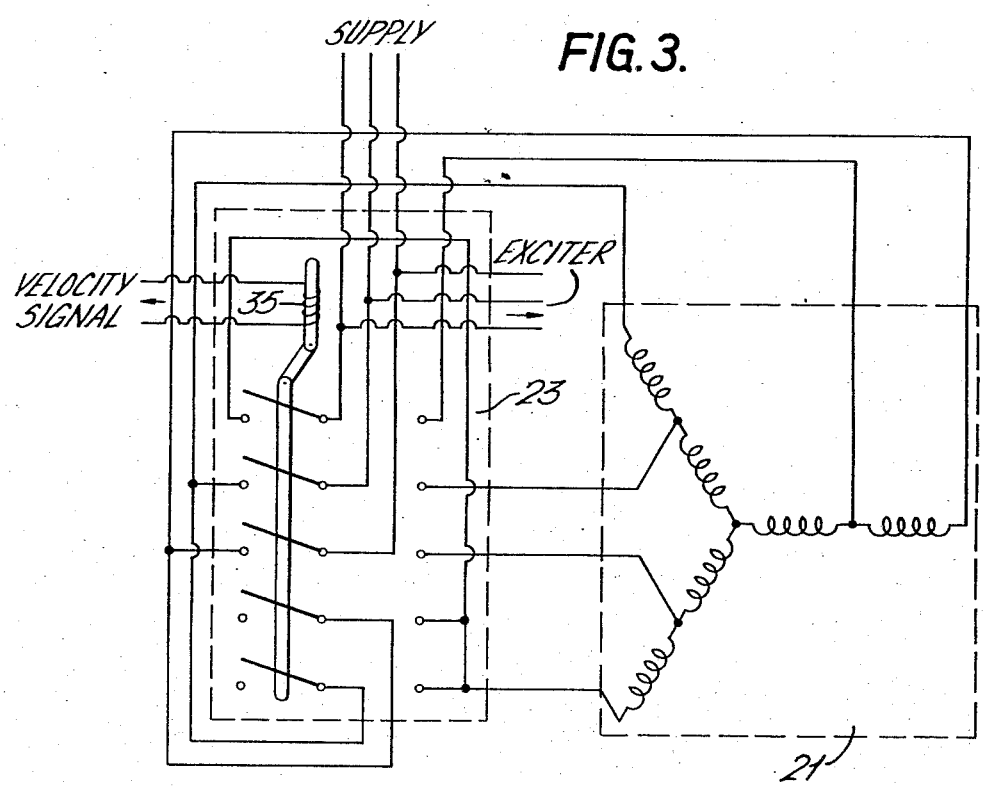
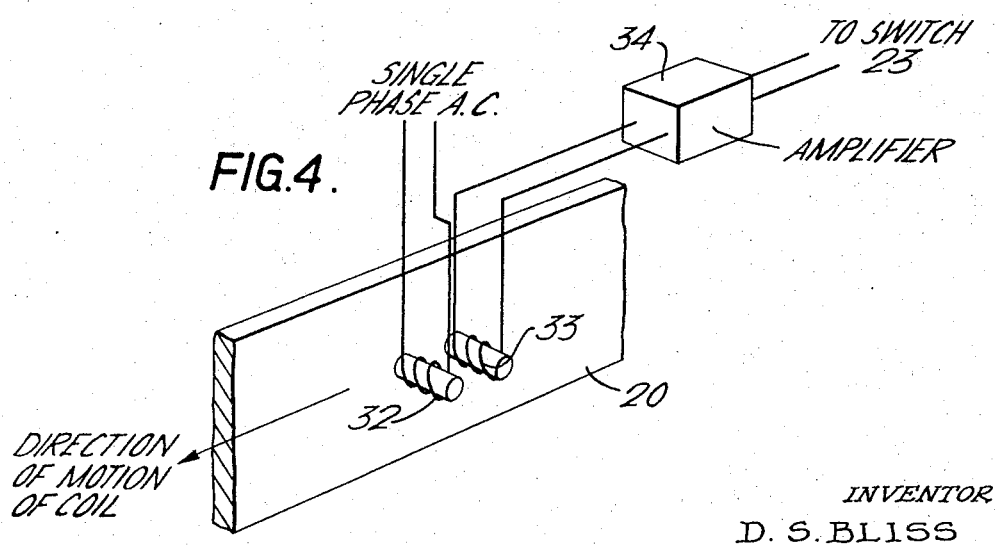

United States Patent Office 3,361,081
Patented Jan. 2, 1968

3,361,081
TRACTION SYSTEMS COMPRISING VEHICLES FOR TRAVELLING ALONG A PREPARED TRACK
Denys Stanley Bliss, Ashurst, Southampton, England, assignor to Hovercraft Development Limited, London, England, a British company
Filed Sept. 26, 1966, Ser. No. 582,066
Claims priority, application Great Britain, July 2, 1962, 25,285/62
12 Claims. (Cl. 104—148)

ABSTRACT OF THE DISCLOSURE

A traction system embodying vehicles propelled over a prepared track by linear motors cooperating with conductor means associated with the track is provided with means for ensuring that, in the event of failure of the power supply to the linear propulsion motor, the motor field continues to be excited by auxiliary excitation means so that the motor acts regeneratively to provide continuity of power supply for the vehicle as it slows down. An air-cushion supported vehicle system is described wherein a power supply has to be maintained for the purpose of retraining the cushion support.

---

Figure 1:
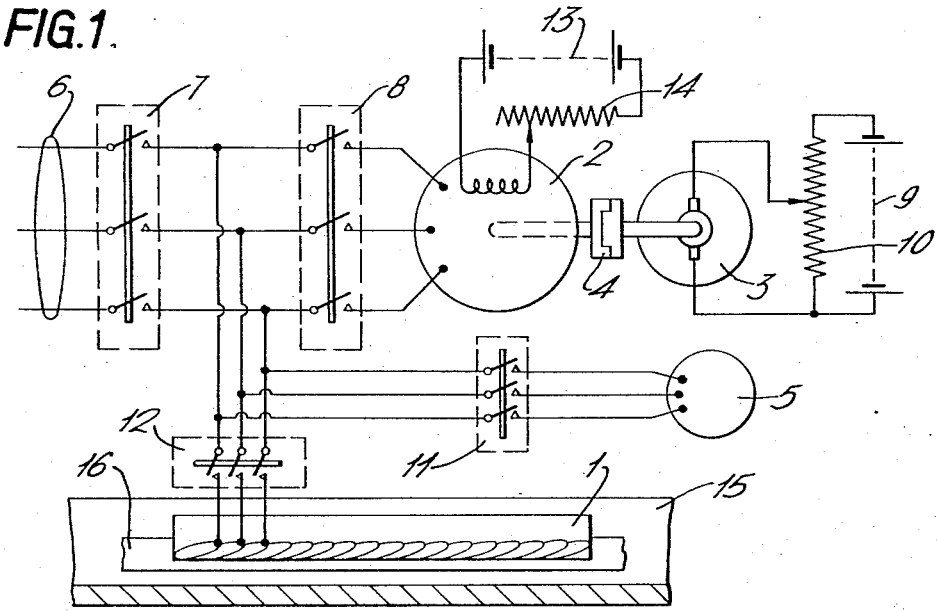

This invention relates to traction systems comprising vehicles for travelling over a prepared track, and is concerned, though not solely, with such systems where the vehicles are at least partly supported by the track on a cushion of fluid, enabling wheels, with their speed and load restrictions, to be dispensed with, at least for the high speed portion of the vehicles' operating range. Details of track forms and designs of vehicles are given in the specification and drawings in U.S. patent specification No. 3,174,401.

The invention relates particularly to such traction systems involving the use of linear electric induction motors, these latter being referred to hereinafter as "linear motors." In such systems, a vehicle, which may be one of a train is arranged to run in conjunction with a track which has means adapted to cooperate electromagnetically with means on the vehicle to cause movement of the vehicle along the track. The vehicle carries windings for creating a magnetic field which travels along the direction of motion and the track has cooperating means, such as an electrically conducting strip, or another set of windings, which interact(s) with the first set of windings to produce a force causing the movement of the vehicle along the track; the force is in such a direction as to reduce the relative velocity between the field and the track cooperating means.

A linear motor, like other electromagnetic machines, can function either as motor or generator, without reconnection of the windings or of the supply. The direction of current flow through the motor is simply determined by the relative speed of the travelling field and the conductor. If the latter is less than the speed of the travelling magnetic field, the machine is a motor, drawing electrical power from the supply and supplying force in an attempt to raise the relative speed to that of the field. If the relative speed exceeds that of the field, the power flow is reversed and the motor acts as a generator, supplying electrical power into the supply to which it is connected and producing force in such a direction as to tend to reduce the relative speed to the field speed.

The simplest arrangement for a track of appreciable length will of course be one in which the track includes a continuous conducting strip, since there is then no necessity to provide more than the relatively small travelling field windings which are carried by the vehicle; moreover, by this means a multiplicity of separate vehicles may be controlled independently on the same track. The conducting strip will be for the linear motor what would comprise the rotor of a conventional rotary induction motor and the said windings on the vehicle(s) will be the stator(s). The latter windings will be energised for travel of a vehicle by power derived either from a common source of polyphase alternating current feeding conductors in, or along, the track or, possibly, from a generator carried on board the vehicle. If necessary, speed variation with a linear motor can be obtained. Thus the frequency of the supply voltage can be varied but as an alternative, tappings to the, or certain windings of the stator may be arranged to be switched to give a change of the pole-pitch, the speed of the travelling field of the motor, for constant supply frequency, being directly proportional to pole-pitch, so that speed increases may be obtained by switching the windings in stages. In view of the mode of support of the vehicles, wheels being dispensed with at higher speeds (for instance by being retracted), frictional forces are greatly reduced and in such systems very high speeds are attainable.

Particularly in view of such high speeds of travel, but also at moderate speeds, the problem of braking a vehicle is acute and proposals to meet that problem are given in our copending serial application No. 582,067, filed Sept. 26, 1966. In addition however, it becomes necessary to take precautions to avoid shock which might otherwise arise from failure of power supply to the motors for operating supply means which provide the fluid necessary to generate the pressurised supporting cushion, since, even though the vehicle may be provided with wheels for low speed travel, contact of these wheels, or, if the wheels are retracted, contact of parts of the body of the vehicle itself, with the track, will possibly cause severe instability at the higher speeds. The present invention is directed to providing "emergency" drive arrangements to maintain the necessary lift, at least, until the speed of the vehicle has been reduced to a value such that wheeled contact or skid contact may be made.

According to the present invention, it is intended to use a linear motor, normally used for driving a vehicle, the secondary member being fitted to the track, as an induction generator in the event of a main power failure, so that its output can be used to supply other apparatus, such as fan motors, vital to the stability of the vehicle. Two conditions are necessary for the linear motor to function as a generator. Firstly, it must be connected to an auxiliary source of reactive va. and secondly its speed must be less than the synchronous speed indicated by the frequency of the auxiliary source.

In accordance with one aspect of the invention, in a traction system comprising a vehicle for travelling over a prepared track in which linear motor means on the vehicle cooperates with conductor means associated with the track and with a main power supply to provide tractive effort for the vehicle, auxiliary means is carried by the vehicle and is arranged to ensure excitation of at least part of the magnetic field of said motor means and means is provided for ensuring that, in the event of cessation of power supply to the said motor means when the vehicle is in motion, the speed of the travelling magnetic field created by the part at least of the motor means is thereafter lower than the actual speed of the vehicle, whereby the motor means functions regeneratively to provide power as the vehicle slows down.

In accordance with another aspect of the invention in a traction system comprising a vehicle for travelling over a prepared track in which linear motor means on the vehicle cooperates with conductor means associated with the track and with a main power supply to provide tractive efforts for the vehicle, auxiliary means carried by the vehicle is arranged to ensure excitation of at least part of the magnetic field of said linear motor means in the event of cessation of the main power supply when the vehicle is in motion, said excitation means being an alternator generator which, after said cessation of power supply, operates at a frequency during slow down of the vehicle which is slightly greater than that which is equivalent to producing the speed of the travelling magnetic field created by the part at least of the magnetic field of the motor means, whereby the motor means functions regeneratively to provide power as the vehicle slows down.

In accordance with yet another aspect of the invention a traction system for use in conjunction with a prepared track having conductor means associated therewith and fixed relatively thereto, comprises a vehicle for travelling over said track, at least one linear motor means on said vehicle, said linear motor means having windings arranged for a plurality of different pole-setting connections, the poles when energised being arranged to provide a travelling magnetic field which cooperates with said conductor means to provide a reaction force for driving the vehicle, switching means having connections to said windings, a supply of power for said motor means, means for providing a signal proportional to the speed of the vehicle, auxiliary excitation means, said excitation means being carried by the vehicle and being arranged to provide suitable excitation of the magnetic field of at least part of said motor means, said switching means being adapted to connect said windings for the said different pole-settings in dependence upon said speed signal and being adapted, on failure or disconnection of said power supply when the vehicle is in motion, to change said pole-settings for successively lower speed settings as the speed of the vehicle decreases, so that the motor means is set to be, in effect, overrun by the vehicle, with the result that, despite the failure or disconnection of main power supply the linear motor means acts regeneratively through excitation of its magnetic field by said excitation means, to maintain a source of power supply for the vehicle.

In accordance with another aspect of the invention a traction system for use in conjunction with a prepared track having conductor means associated therewith and fixed relative thereto, comprises a vehicle for travelling along said track, means for generating a pressurised cushion of fluid to support the vehicle by reaction with the track, electrically-driven compressor means for feeding fluid to said cushion generating means, at least one linear motor means on the vehicle cooperating with said conductor means associated with the track and with a main power supply to provide tractive effort for the vehicle, auxiliary means carried by the vehicle and arranged to ensure excitation of at least part of the magnetic field of said motor means and means for ensuring that, in the event of cessation of power supply to said motor means when the vehicle is in motion, the speed of the travelling magnetic field created by the part at least of the motor means is thereafter lower than the actual speed of the vehicle, whereby the motor means functions regeneratively to provide power to said cushion generating means as the vehicle slows down.

The said auxiliary means may be a reactive device adapted to be brought into use, preferably automatically, upon said failure or disconnection of the power supply, or it may comprise, for example, a generator in the form of a power oscillator, which may be battery-operated, or a rotary generator, driven by an auxiliary power means possibly from a battery. In the latter cases, the auxiliary generating means may be arranged to provide a substantially constant frequency output, the pole-pitch of the driving motor means, or of the part thereof, then being arranged so that the synchronous speed setting of the motor means, or of the part thereof, is made progressively lower than the speed of travel of the vehicle, as the latter slows down. Alternatively, it may be arranged that the pole-pitch of the driving motor, or of the part thereof, remains unchanged, but that the frequency of excitation is reduced as the vehicle slows; for example, the generator output may be arranged to be a function of the speed of the vehicle and preferably proportional to a speed which is slightly in excess of that of the vehicle. It is also possible that combinations of these alternative arrangements may be made to give optimum conditions of operation; but in such cases it would almost certainly be necessary to make the system fully automatic.

In order that the invention may be better understood, embodiments thereof will now be described with reference to the accompanying diagrammatic drawings, of which FIGURE 1 illustrates one arrangement utilising frequency control and FIGURES 2, 3 and 4 an arrangement incorporating pole-changing operations.

Referring now to FIGURE 1, the linear motor 1 is mounted on a vehicle which carries an auxiliary alternator 2, a direct current motor 3 coupled to the alternator shaft through a clutch 4 and a motor 5 arranged to drive a fan for generating the pressurised fluid supporting cushion for the vehicle. The vehicle operates on the prepared track 15 and the motor 1 cooperates with the conductor 16 which is rigid with the track. It will be understood that more than one cushion may be provided and the fact that the description is tied to one cushion will not affect the understanding of the invention. The alternator is excited by a battery 13 and the excitation is controlled by resistance 14.

Power for energising the fan motor is normally derived from a main power supply 6 through a main switch 7 and fan switch 11 and, provided that there is no fault in the power supply the vehicle would operate satisfactorily through the control of these two switches and traction motor switch 12 so that build-up of the supporting cushion can be effected before energising the traction motor; there would be no necessity for the alternator 2 and motor 3 with their ancillary equipment because the supply of fluid to the supporting cushion could be readily maintained from the main power supply.

However, should the supply of power to the fan motor 5 fail, the shock and instability referred to above would ensue. The alternator 2 will operate to prevent this. In normal running conditions, main switch 7 is closed and the alternator 2 is brought up to speed by the motor 3 which is a comparatively small machine energised by a battery 9 through a speed control resistance 10. The alternator is then synchronized to the main supply 6 by closing the switch 8. The motor 3 can then be decoupled from the alternator by disengaging the clutch 4 and the motor can be stopped since it takes no further part in the operation, its only purpose being to start the alternator.

The alternator normally runs as a motor supplying its own friction and windage losses but it can be arranged to drive small mechanical loads, such as pumps, cabin ventilating fans or the like. Alternatively, it may drive one or more fans for auxiliary cushion generating means for the vehicle.

In the event of main power failure, which has the same effect, of course, as opening main control 7 the fact that the auxiliary machine 2 is excited from a battery ensures that the supply voltage to the linear induction motor 1 does not collapse. The motor 1 now acts regeneratively since it is the only possible source of power to supply the mechanical losses of the auxiliary machine together with any mechanical load which the latter may be supplying any any electrical load such as the fan motor 5 which are connected to the system; the presence of all such loads, either electrical or mechanical, will cause the alternator 2 to slow down thereby reducing the frequency of the voltage at the linear motor terminals to cause the linear machine to function as a generator. As energy is drawn from the system, the braking force produced by the linear machine on the track will cause the vehicle to reduce speed, tending to reduce the slip of the linear machine. As this occurs the alternator 2 will self-regulate and reduce its speed so as to maintain the loads.

With the basic system shown in FIGURE 1, there is no separate control over the frequency which is fed to the loads as the vehicle decelerates. The frequency of the whole system reduces in sympathy, and hence so does the speed of any induction or synchronous motors which are fed from the system. Control of voltage can be effected, if necessary, by regulating the exciting current of the alternator by means of the variable resistor 14.

Below a certain speed which depends on the parameters of the system, the alternator 2 cannot supply all the reactive va. needed and the electrical action collapses. The parameters will have been suitably chosen, however, to ensure that collapse will only occur after the vehicle has been decelerated to a speed at which collapse of cushion fan supplies can occur without danger.

In other embodiments the linear motor may be arranged as a pole-change machine in which the supplies may be reconnected to produce a different pole-pitch and therefore a different synchronous speed at a given frequency. Such switching arrangements are part of the known art and one example will now be described with reference to FIGURES 2, 3 and 4.

Figure 2:
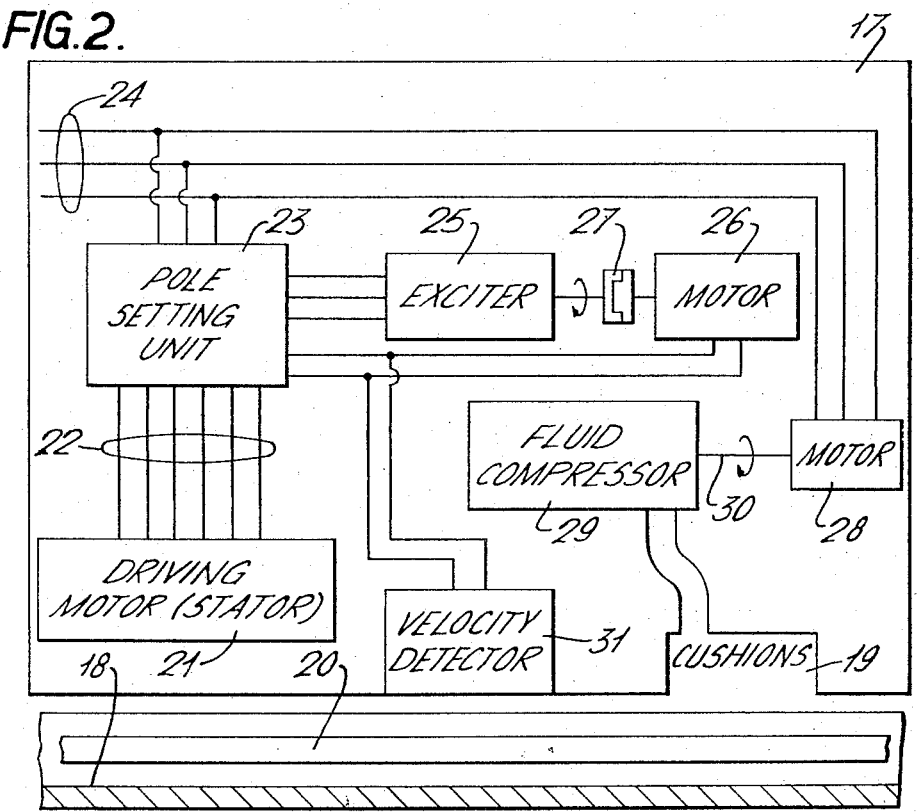

In FIGURE 2, the vehicle 17 is shown as being associated with a prepared track 18 on which it may be supported, for at least part of its travel, on at least one cushion of pressurised fluid, such as is indicated at 19.

A substantially continuous conductor 20 is arranged to extend parallel to the track and is rigid therewith; the vehicle is provided with a linear driving motor 21 which has windings that, when energised as explained by Steinmetz at pages 20 et seq. of his book "Theory and Calculations of Electrical Apparatus" (McGraw-Hill, 1917), provide spaced poles and these poles cooperate with the conductor 20 to provide a reaction between the vehicle and the conductor, which reaction provides driving effort for the vehicle. Leads from the individual windings of the motor 21 are connected by leads 22 to terminals of a unit 23 and this unit has switching arrangements for connecting the windings in a number of different ways so as to enable the pitch of the poles of the motor to be changed, as further explained by Steinmetz, from one speed setting to another.

The arrangement of the stator windings of the driving motor 21 and of the connections to the pole-setting switch 23 are shown in more diagrammatic detail in FIGURE 3. In the "make" position of the switch to the left in the drawing the windings are set to give a higher effective pole-pitch than when they are set by the switch in the "make" position to the right. In normal running therefore the vehicle will have a greater speed for the "left-hand" setting than for the "right-hand" setting of the switch.

In order to cater for power failure at the mains 24, the field of the motor 21 is arranged to be maintained by an excitor 25 driven by a motor 26 through a clutch 27 as in the arrangement described with reference to FIGURE 1.

A motor 28 which normally derives its power from the mains 24 is connected to a compressor fan 29 through shaft 30 and this fan maintains the supporting cushion 19.

A velocity detector 31 is provided to supply a signal proportional to the speed of the vehicle. This may be a propeller-driven tachometer generator which generates a voltage signal depending upon the speed of its rotor, and therefore on the speed of the vehicle. Alternately, it may take the form shown in FIGURE 4 which takes advantage of the conductor 20 in the track. A linear equivalent of a drag-cup alternating current tachometer is formed by setting up two spaced coils 32, 33 on the vehicle and adjacent the conductor 20. Coil 32 is fed from a single-phase alternating current source of fixed frequency and low power such as might be provided by an electronic oscillator. The voltage induced in the coil 33 by the drag-up effect is conducted to an amplifier 34 and the amplified signal is applied, possibly through a series of relays, to the operating electromagnet 35 of the pole-setting switch 23. The induced voltage in coil 33 is proportional to the speed of the vehicle and the electromagnet 35 is set to operate the switch when the speed of the vehicle falls below the speed for which the other pole-setting would be more appropriate, that is when the voltage at the electromagnet that is derived from the speed signal falls below a certain value.

The same speed-measuring device can also be used to control the speed of the small motor 26 and to activate the clutch 27 so that the motor 26 can assist in accelerating the alternator 25 during the period immediately following a pole-setting change; this is desirable because the effect of a sudden change in pole-pitch is to generate a large current from the linear motor, tending to raise the speed of the alternator and such excess current should not be maintained for longer than necessary. Accordingly the speed measuring device is shown in FIGURE 2 as being connected directly to both the pole-setting mechanism and the drive to the auxiliary alternator.

Another means of using a speed signal is to use a speed responsive generator as disclosed in U.S. patent specification No. 1,365,316, according to which a system of speed relays is adapted to be operated by the generator in steps corresponding to certain speeds of the vehicle. Such speed relays could be used, for example, in conjunction with the pneumatically-operated automatic speed controller disclosed in the same U.S. patent specification; as will be clear the speed relays could be used to cause actuation of the pneumatic valves which operate the main controller for pole-setting. The sequence of settings will then be appropriate to the required rising or falling speed of the vehicle.

If a wider range of speed control is desired, then it may be necessary to provide further stages of pole-pitch settings. This may be achieved by providing stator windings in the form described at page 570 of "Winding Alternating Machines," by Liwzchitz-Garik, published 1950 by Van Nostrand; these windings are such as to permit of four different pole-pitch settings and therefore four speed settings. The connection scheme for the pole-setting unit 23 to enable the windings to be set for each of the four pole-combinations 6/8/12/16 are indicated at page 587 of this same textbook. The operation of such wider range pole-setting unit and of the system including it will be apparent to those skilled in the art.

In the event of power failure, the alternator 25 maintains the field of the linear motor as in the system of FIGURE 1 and the linear motor functions regeneratively since a load is immediately placed on the alternator which reduces the frequency of the voltage at the field windings of the motor. The speed signal to the electromagnet 35 of the pole-setting switch falls until the vehicle has slowed down to the point where the electromagnet functions to change the switch 23 over to the right-hand position. Thereafter, so long as the speed of the vehicle remains above the speed of the travelling field of the motor, the motor is maintained in regenerative condition until such time as the speed of the vehicle falls to that of the field at the lower speed setting. The electrical action at the motor windings then collapses and the supporting cushion is no longer maintained; the system is, however, so designed that the speed of the vehicle is low enough for touch-down to take place on the track without fear of dangerous instability. The supporting cushion is therefore maintained after power failure for sufficient time for safety to be ensured. It is apparent, of course, however, that the emergency supply may be of use for other, or additional, purposes and it is not intended that the scope of the invention should be confined to maintenance of pressurised support cushions for the vehicle.

In reference to the excitation of the motor field, it is not necessary for the exciting voltage to be supplied by an alternator.

An induction machine can be caused to generate if its stator windings are simply connected to a capacitive reactance which will supply reactive va. to the machine. In such a system it is not obvious at what frequency the machine will generate. In the case of an auxiliary alternator, the latter's prime mover determines the frequency in the event of such prime mover being more powerful than that of the induction generator, less than electrical load which it supplies. If the prime mover of the auxiliary alternator is weak, the frequency of the generated A.C. will be set by the speed of the induction machine. A capacitive reactance auxiliary system is comparable with the latter case in that the speed of the generator sets the frequency which however, is modified by the load power delivered. The difference in the case of the capacitive auxiliary is that the induction generator must excite to such a flux density that its magnetising reactance is caused to tune with the capacitance at the frequency dictated by prime mover and load. In this respect it resembles a D.C. generator whose terminal voltage depends on the shape of the B-H characteristic of the steel used in the machine. This is merely a matter of design.

If other excitation means are required to be used they may be substituted for the alternator as the exciter 25 and, if no rotary machine is involved the prime mover 26 will not be required; nor will it be necessary for a speed signal to be fed from the velocity detector to the excitation means. Other modifications as required will be evident to those skilled in the art.

I claim:

1. A traction system comprising a prepared track, a vehicle for travelling along said track, linear motor driving means on said vehicle, conductor means along said track and rigid therewith, a main alternating current power supply, and auxiliary excitation means carried by the vehicle for maintaining excitation of at least part of the magnetic field of the linear motor driving means, said linear motor driving means being adapted, when energised from said main supply, to produce a travelling magnetic field which reacts with said conductor means to provide tractive effort for driving the vehicle along the track, and said auxiliary excitation means being so arranged that, in the event of cessation of the supply of power to said linear motor driving means from said main supply when the vehicle is in motion, the speed of the travelling magnetic field resulting from the excitation of the linear motor windings by said auxiliary excitation means is lower than the actual speed of the vehicle, whereby the linear motor driving means functions regeneratively to provide power as the vehicle slows down.

2. A traction system as claimed in claim 1, wherein said auxiliary excitation means is an alternator generator, the field winding of which is battery energised and which is adapted to be normally synchronised with the main supply.

3. A traction system for use in conjunction with a prepared track having conductor means associated therewith and fixed relatively thereto, comprising a vehicle for travelling over said track, at least one linear motor means on said vehicle, said linear motor means having windings arranged for a plurality of different pole-setting connections, the poles when energised being arranged to provide a travelling magnetic field which cooperates with said conductor means to provide a reaction force for driving the vehicle, switching means having connections to said windings, a supply of power for said motor means, means for providing a signal proportional to the speed of the vehicle, and auxiliary excitation means, said excitation means being carried by the vehicle and being arranged to provide suitable excitation of the magnetic field of at least part of said motor means, said switching means being adapted to connect said windings for the said different pole-settings in dependence upon said speed signal and being adapted, one failure or disconnection of said power supply when the vehicle is in motion, to change said pole-settings for successively lower speed settings as the speed of the vehicle decreases, so that the motor means is set to be, in effect, overrun by the vehicle, with the result that, despite the failure or disconnection of main power supply, the linear motor means acts regeneratively through excitation of its magnetic field by said excitation means, to maintain a source of power supply for the vehicle.

4. A traction system as claimed in claim 3, wherein said auxiliary excitation means comprises an alternator, driven by auxiliary power means.

5. A traction system as claimed in claim 3, wherein said auxiliary excitation means comprises a generator in the form of a power oscillator, which may be battery-operated.

6. A traction system in accordance with claim 3, wherein said auxiliary excitation means is a reactive device adapted to be brought into use, preferably automatically, upon said failure or disconnection of the power supply.

7. A traction system in accordance with claim 6, wherein the generator is arranged to provide a substantially constant frequency output and wherein the pole-pitch of the driving motor means is arranged so that the synchronous speed setting of the driving motor means, or of the part thereof, is made progressively lower than the speed of travel of the vehicle, as the latter is slowing down.

8. A traction system in accordance with claim 6, wherein the pole-pitch of the driving motor means is arranged to remain unchanged, at least in the conditions of power failure or disconnection, and wherein the frequency of excitation by said auxiliary generator is arranged to be reduced as the vehicle is slowing down.

9. A traction system in accordance with claim 8, wherein the auxiliary generator operates during slow-down of the vehicle to excite said magnetic field of the motor means at a frequency which is a function of the speed of travel of the vehicle.

10. A traction system as claimed in claim 9, wherein excitation of the field of the generator is arranged to be maintained by an independent power supply and wherein the generator becomes a load on the said regenerating motor means upon cessation of supply so as to ensure that the excitation frequency of the field of the motor means remains proportional to a speed which is slightly in excess of that of the vehicle during slow-down.

11. A traction system comprising a prepared track, conductor means along said track and rigid therewith, a vehicle for travelling along said track, a main alternating current power supply, means for generating a pressurised cushion of fluid to support said vehicle by reaction with the track, compressor means on said vehicle for feeding fluid to said cushion-generating means, an electric motor for driving said compressor and arranged normally to be energised from said main supply, linear motor driving means on said vehicle, and auxiliary excitation means carried by the vehicle for maintaining excitation of at least part of the magnetic field of the linear motor driving means, said linear motor driving means being adapted, when energised from said main supply, to produce a travelling magnetic field which reacts with said conductor means to provide tractive effort for driving the vehicle along the track, and said auxiliary excitation means being so arranged that, in the event of cessation of the supply of power to said linear motor driving means from said main supply when the vehicle is in motion, the speed of the travelling magnetic field resulting from the excitation of the linear motor windings by said auxiliary excitation means is lower than the actual speed of the vehicle, whereby the linear motor driving means functions regeneratively to provide power to said compressor driving motor as the vehicle slows down.

12. A traction system for use in conjunction with a prepared track having conductor means associated therewith and fixed relative thereto, comprising a vehicle for travelling along said track, means for generating a pressurised cushion of fluid to support the vehicle by reaction wtih the track, electrically-driven compressor means for feeding fluid to said cushion generating means, at least one linear motor means on the vehicle cooperating with said conductor means associated with the track and with a main power supply to provide tractive effort for the vehicle, a pole-changing facility for said linear motor means, auxiliary means carried by the vehicle and arranged to ensure excitation of at least part of the magnetic field of said motor means, means for providing a signal proportional to the speed of the vehicle along the track, and a control connection from said speed signal means to said pole-changing facility to ensure that, in the event of cessation of power supply to said motor means when the vehicle is in motion, the speed of the travelling magnetic field created by the part at least of the motor means is thereafter lower than the actual speed of the vehicle, whereby the motor means functions regeneratively to provide power to said cushion generating means as the vehicle slows down.

References Cited

UNITED STATES PATENTS 1,231,665  7/1917  Storer _____ 318—87 X

FOREIGN PATENTS 867,045  5/1961  Great Britain.

ARTHUR L. LA POINT, *Primary Examiner.*

STANLEY T. KRAWCZEWICZ, *Examiner.*